UNITED STATES PATENT OFFICE.

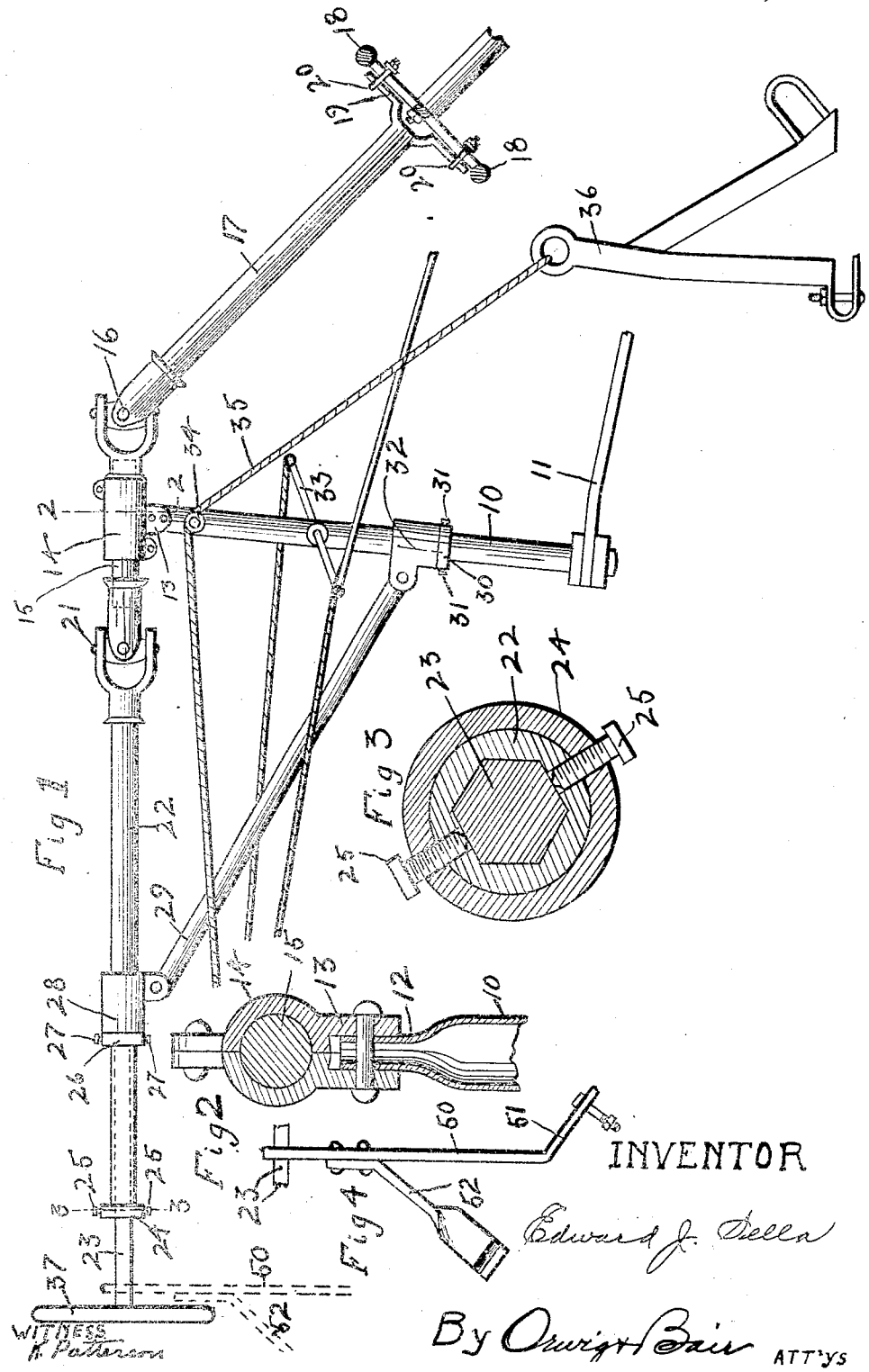

EDWARD J. SELLA, OF JEWELL, IOWA.

EXTENSION STEERING DEVICE.

1,347,296.  Specification of Letters Patent.  Patented July 20, 1920.

Application filed January 13, 1920. Serial No. 351,181.

*To all whom it may concern:*

Be it known that I, EDWARD J. SELLA, a citizen of the United States, and a resident of Jewell, in the county of Hamilton and State of Iowa, have invented a certain new and useful Extension Steering Device, of which the following is a specification.

The object of my invention is to provide a steering and control device for operating a tractor from the seat of a binder or mower of simple, durable and inexpensive construction.

Still a further object is to provide such a device adapted to be mounted on the tractor and having a supporting member with a steering shaft supported at its upper end, which steering shaft is connected at one end with the steering rod of a tractor, and at the other end by means of flexible and extensible connections with an ordinary steering wheel.

The further particular objects of my invention will appear in connection with the description of the construction and operation of my device and with the objects mentioned and others in view my invention consists in the construction, arrangement and combination of the various parts of the device, whereby the objects contemplated are attained, as hereinafter more fully set forth, pointed out in my claims and illustrated in the accompanying drawings, in which:

Figure 1 shows a side elevation of a steering and control device embodying my invention.

Fig. 2 is a detail, sectional view taken on the line 2—2 of Fig. 1.

Fig. 3 is a detail, sectional view taken on the line 3—3 of Fig. 1; and

Fig. 4 is a detail view showing a side elevation of a detachable supporting device for the rear end of the extension steering device.

In the accompanying drawings I have used the reference numeral 10 to indicate generally an upright support which may have the form of a post or pipe, which is designed to be rigidly mounted on the frame of a tractor.

I have shown in the drawings the brace 11 connected with the upright 10.

Mounted on the upright 10 is a bearing for a shaft forming part of a steering shaft or post.

This bearing may have a variety of forms, but as illustrated in the drawings, the upper end of the upright 10 is reduced at 12 and is projected into a socket 13 formed at the lower portion of a two-part bearing 14, in which the short shaft 15 is rotatably mounted.

At its forward end the shaft 15 is connected by a suitable universal joint 16 with a shaft 17 which is in turn connected with a steering wheel 18 of the tractor.

The shaft 17 may be connected in any suitable way with the steering shaft proper of the tractor, such for instance, as shown in my prior application for patent Serial Number 285,118, filed March 25, 1919.

In the drawings herewith I have illustrated the shaft 17 with oppositely extending arms 19 at its forward end which are locked to the spokes of the steering wheel 18 by means of U-bolts 20.

The rear end of the short shaft 15 is connected by a universal joint 21 with a shaft 22 preferably tubular, and preferably having its opening angular in cross section as illustrated in Fig. 3.

Slidably mounted in the rear portion of the tubular steering rod member 22 is a steering rod member 23 preferably angular in cross section, so that the rod 23 may slide freely in the rod 22, but will not rotate therein.

Mounted on the rear end of the shaft 22 is a collar 24 in which are mounted set screws 25 which project through suitable openings in the tubular steering shaft member 22 and are adapted to engage the steering shaft member 23 for locking the steering shaft members 22 and 23 against sliding movement with relation to each other.

The members 22 and 23 with the means for connecting them afford an extension steering rod which may be adjusted to a great variety of lengths.

Mounted on the shaft 22 at a suitable point thereon, is a collar 26 held in place by set-screws 27, and which may be thus adjustably locked on the shaft 22 in a variety of positions.

Mounted on the shaft 22 forwardly of the collar 26 is a sleeve or bearing 28 to which is pivoted a downwardly and forwardly extending brace or link 29.

Mounted on the lower part of the post or upright 10 is a collar 30 similar to the collar 26, which is adjustably held in position by means of set-screws 31.

Mounted on the upright 10 just above the collar 30 is a bearing or sleeve 32 similar to the bearing or sleeve 28, which is pivotally connected with the lower end of the brace 29.

Supported on the upright 10 is the appropriate throttle control mechanism 33 similar to that disclosed in my prior application.

On the upright 10 is also a pulley or guide 34 for a flexible device 35 connected with a clutch control member 36. All of these latter parts being similar in construction to those disclosed in my heretofore identified prior application.

I may mention in this connection that my present application has to do with the steering mechanism particularly, but this mechanism is of course preferably used in connection with the other features shown herein and in my prior application.

My present invention embodies particularly an upright post designed to be mounted on the tractor, and a single relatively short steering shaft member mounted at the upper end of said post for rotation, but held against either horizontal or vertical pivotal or swinging movement, together with means for operatively connecting the forward end of said short shaft with said steering shaft, and also together with a shaft connected with said short shaft at the rearward end thereof by a universal joint, which latter shaft is connected with the steering wheel and is held raised to a certain height horizontally by means of the brace 29, which is so connected with the post 10 as to permit the shaft 22 and the brace 29 to swing freely horizontally, which brace is also so connected with the shaft 22 as to permit said shaft to be raised, but not to be lowered below a certain point.

In providing an extension steering device having the general purpose of permitting a tractor to be driven from the seat of another machine, several important problems are involved.

It is very desirable that the steering wheel should be supported so as to be convenient of access to the driver seated on the seat, for instance, of a binder drawn from the tractor. Where the steering device is of the extension type it is desirable that the wheel should be supported by the mechanism which mounts the steering device on the tractor, so as to hold the wheel at a certain height, and that the means for so supporting the rear end of the steering mechanism and the wheel should be adjustable for properly supporting the wheel for use with different kinds of machines such, for instance, as mowers or binders, corn harvesters and so on.

Another problem is involved in the fact that while the steering wheel should be supported on the tractor independent of the binder or the like it also must have free movement with relation to the forward portion of the steering mechanism by means of universal joint connects or otherwise, but to permit the steering wheel to remain close to the seat of the binder, for instance, when the tractor is making a turn, and must be able to move to a certain extent up and down for the reasons which will now be explained. Thus another problem that must be met arises from the fact that the rear portion of the tractor, which supports the steering mechanism will, on account of inequalities in the ground, be raised or lowered in the course of the use of the machines with relation to the binder. It will be seen that if the back wheels of the tractor should run over an elevation this would simply result in raising the steering wheel which would do no damage.

On the other hand if the back wheels of the tractor should drop into a depression this would tend to drop the steering wheel, and if the steering wheel were rigidly connected against up and down movement, it might strike the legs of the driver and cause serious injury.

It will be seen, therefore, that if the steering wheel is connected by a series of universal joints or flexible connections with a steering shaft, and is not supported at a certain height by means of the tractor alone, then there must be provided some means for mounting the steering wheels on each additional piece of machinery which may be employed in order to protect the driver from the contingency last mentioned.

On the other hand if the steering wheel is supported at a certain height by means mounted on the tractor there must be some way provided for preventing the steering wheel from dropping against the legs of the driver and pinching them in the manner hereinbefore mentioned.

This danger is avoided in the present construction by using the brace 29 and the sleeve 28 it makes it possible for the driver to hold on to the steering wheel and to hold it up in case the rear wheels of the tractor should drop downwardly and tend to drop the wheel at the same time.

Even if the driver should not hold the steering wheel up and the steering wheel should drop downwardly and strike his legs, it would not be hard to hold it rigidly by the support on the tractor, and when it met with a resistance would swing upwardly on its pivot point where it is connected with the sleeve 32, and the sleeve 28 would slide forwardly from the collar 26 on the shaft 22!

It will be seen that all the other problems above enumerated have been mentioned by my present construction.

The height at which the steering wheel is supported may be readily regulated by loosening the collar 26 on the collar 30 and adjusting said collars or either of them.

The steering wheel 37 and the shafts connected therewith can be readily swung laterally on the pins provided by the universal joint 21 and the sleeve 32 which rotates on the upright 10, for permitting the tractor to make a turn without swinging the steering wheel out of the hand of the driver.

At the same time under all conditions of use the steering wheel can be readily rotated and will rotate the shafts 23, 22, 15, and 17 for imparting rotation to the steering shaft proper.

If, for any reason, it should be desired to provide a support for the rear end of the extensible steering device, I have shown in Fig. 4 an upright bracket 50 having at its lower end an inclined extension 51 which may be bolted to another part of the seat supporting arm and the shaft 23 may be loosely mounted in the upper end of the upright 50.

The steering rod member 23 may be supported in the upper end of the upright bracket 50 by being extended therethrough or seated in a notch therein.

It will be seen that where the steering rod member 23 rests in a notch in the bracket 50, then if the rear wheels of the tractor should travel over a raised part of the ground, the bracket 50 would support the steering wheel and parts connected therewith and prevent them from dropping into the lap of the driver.

Some changes may be made in the construction and arrangement of the parts of my improved extension steering device without departing from the essential features and purposes of my invention, and it is my intention to cover by my claims any modified forms of structure or use of mechanical equivalents which may be reasonably included within the scope of my claims.

I claim as my invention:

1. In a device of the class described; an upright support designed to be mounted on a tractor; a short shaft supported in substantially horizontal position for rotation on said upright support; means for operatively connecting one end of said short shaft with the steering shaft of a tractor; a shaft connected by a universal joint with said short shaft; a brace slidably mounted on said second shaft, to permit the second shaft to rotate; means for supporting said brace on said upright for permitting swinging movement of the brace with relation to the upright; and a steering wheel operatively connected with said second shaft.

2. In a device of the class described; an upright support designed to be mounted on a tractor; a short shaft supported in substantially horizontal position for rotation on said upright support; means for operatively connecting one end of said short shaft with the steering shaft of a tractor; a shaft connected by a universal joint with said short shaft; a brace slidably mounted on said second shaft, to permit the second shaft to rotate; means for supporting said brace on said upright for permitting swinging movement of the brace with relation to the upright; and means for limiting the sliding movement of said brace on said second shaft; and a steering wheel operatively connected with the second shaft.

3. In a device of the class described; an upright support designed to be mounted on a tractor; a short shaft supported in substantially horizontal position for rotation on said upright support; means for operatively connecting one end of said short shaft with the steering shaft of a tractor; a shaft connected by a universal joint with said short shaft; a brace slidably mounted on said second shaft, to permit the second shaft to rotate; means for supporting said brace on said upright for permitting swinging movement of the brace with relation to the upright; a steering wheel operatively connected with the second shaft; adjustable means adapted to be mounted in various positions on said second shaft for limiting the sliding movement of said brace in one direction thereon; and a steering wheel operatively connected with said second shaft.

4. In a device of the class described; an upright support designed to be mounted on a tractor; a short shaft supported in substantially horizontal position for rotation on said upright support; means for operatively connecting one end of said short shaft with the steering shaft of a tractor; a shaft connected by a universal joint with said short shaft; a brace mounted on said second shaft, to permit the second shaft to rotate; means for supporting said brace on said upright for permitting swinging movement of the brace with relation to the upright; and means for adjustably supporting one end of said brace in various positions on said upright and for limiting the downward movement of the brace thereon.

5. In a device of the class described; an upright support designed to be mounted on a tractor; a short shaft supported at the upper end thereof for rotation in substantially horizontal position; means for connecting the forward ends of said short shaft with the steering wheel of a tractor; said means including a universal joint; a shaft; opposite arms on said shaft; and means for fastening said arms to said steering wheel; a third shaft; a universal joint for connecting said third shaft to said first shaft; a steering wheel operatively connected with said third shaft; and means for supporting said third shaft from said upright support for permitting said third shaft to swing horizontally or vertically, and for limiting the downward swinging movement of said third shaft.

6. In a device of the class described; an upright support designed to be mounted on a tractor; a short shaft supported in substantially horizontal position for rotation on said upright support; means for operatively connecting one end of said short shaft with the steering shaft of a tractor; a shaft connected by a universal joint with said short shaft; and means for supporting said second shaft from said upright support for permitting the second shaft to swing horizontally or vertically and for limiting the downward swinging movement of said second shaft.

7. In a device of the class described; an upright support designed to be mounted on a tractor; a short shaft supported in substantially horizontal position for rotation on said upright support; means for operatively connecting one end of said short shaft with the steering shaft of a tractor; a shaft connected by a universal joint with said short shaft; and means for supporting said second shaft from said upright support for permitting the second shaft to swing horizontally or vertically and for limiting the downward swinging movement of said second shaft; said means being adjustable for varying the limit of such downward movement.

Des Moines, Iowa, December 8, 1919.

EDWARD J. SELLA.